US012062384B1

(12) United States Patent
Iliadis et al.

(10) Patent No.: US 12,062,384 B1
(45) Date of Patent: Aug. 13, 2024

(54) BATCH SCHEME FOR MAGNETIC-TAPE OPERATION

(71) Applicant: INTERNATIONAL BUSINESS MACHINES CORPORATION, Armonk, NY (US)

(72) Inventors: Ilias Iliadis, Rueschlikon (CH); Mark Alfred Lantz, Adliswil (CH); Slavisa Sarafijanovic, Adliswil (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/351,683

(22) Filed: Jul. 13, 2023

(30) Foreign Application Priority Data

Feb. 15, 2023 (GR) .............................. 20230100122

(51) Int. Cl.
*G11B 15/68* (2006.01)
(52) U.S. Cl.
CPC .................................. *G11B 15/689* (2013.01)
(58) Field of Classification Search
None
See application file for complete search history.

(56) References Cited

U.S. PATENT DOCUMENTS

| | | |
|---|---|---|
| 5,164,909 A | 11/1992 | Leonhardt et al. |
| 5,287,459 A | 2/1994 | Gniewek |
| 5,500,803 A | 3/1996 | Munro et al. |
| 6,154,787 A | 11/2000 | Urevig et al. |
| 9,202,507 B1 | 12/2015 | Krick et al. |

OTHER PUBLICATIONS

Iliadis, et al., "Magnetic Batch Scheme for Tape Operation," Application and Drawings, Filed on Feb. 15, 2023, 37 Pages, Related GR Patent Application Serial No. 20230100122.
Iliadis, et al., "Performance Evaluation of a Tape Library System," 2016 IEEE 24th International Symposium on Modeling, Analysis and Simulation of Computer and Telecommunication Systems, 2016 [accessed on Apr. 25, 2023], pp. 59-68, IEEE, London, UK, DOI: 10.1109/MASCOTS.2016.37, Retrieved from the Internet: <URL: https://ieeexplore.ieee.org/document/7774566>.
Iliadis, et al., "Performance Evaluation of Automated Tape Library Systems," 2021 29th International Symposium on Modeling, Analysis, and Simulation of Computer and Telecommunication Systems, [accessed on Apr. 25, 2023], 8 pages, IEEE, Houston, TX, DOI: 10.1109/MASCOTS53633.2021.9614293, Retrieved from the Internet: <URL: https://ieeexplore.ieee.org/document/9614293>.

(Continued)

*Primary Examiner* — Craig A. Renner
(74) *Attorney, Agent, or Firm* — Daniel J Blabolil

(57) ABSTRACT

A computer-implemented method and a related tape library system for controlling an operation of a tape library system comprising at least one magnetic-tape drive unit and a plurality of tape cartridges, wherein the operation of the tape library system comprises a usage optimization of available resources of the tape library system, is disclosed. The method comprises determining a load value of the resources of the tape library system, accumulating requests to a tape cartridge in a batch before using tape library system to physically accessing the tape cartridge, and dynamically adjusting a number of requests in the batch before physically accessing the tape cartridge dependent on the load value such that a response time of the tape library system is optimized.

18 Claims, 8 Drawing Sheets

(56) References Cited

OTHER PUBLICATIONS

Mäsker, et al., "Simulation and Performance Analysis of the ECMWF Tape Library System", SC '16: Proceedings of the International Conference for High Performance Computing, Networking, Storage and Analysis, Nov. 2016 [accessed on Apr. 25, 2023], pp. 252-263, IEEE, Salt Lake City, UT, DOI: 10.1109/SC.2016.21, Retrieved from the Internet: <URL: https://ieeexplore.ieee.org/abstract/document/7877100>.

BATCH SCHEME FOR MAGNETIC-TAPE OPERATION

BACKGROUND

The invention relates generally to a computer-implemented method for controlling an operation of a tape library system, and more specifically, to a computer-implemented method for controlling an operation of a tape library system using dynamic batch sizes. The invention relates further to a related tape library system, and a computer program product.

RELATED ART

The amount of data managed by IT (information technology) departments of enterprises as well as government institutions is reaching new heights every year. It also increases the burden of managing archives of historic data and data that may not be accessed that often. Magnetic tapes still provide a cost-effective way to retain an offload of continuously increasing volumes of data. The low cost per gigabyte and the low energy consumption may render magnetic tapes a preferred option over hard disk drives, optical drives and flash memory storage for infrequently accessed data. Thereby, assessing the performance of a tape library system is central to achieving appropriate storage provisioning and dimensioning. The performance of a tape library system is affected by the number and the operational characteristics of the tape drives and the typically used robotic arms as well as mount and unmount policies deployed.

In configurations where the number of tape drives is large, the robotic mechanism may become a bottleneck as it is constantly busy performing mount/unmount operations. As a result, cartridges comprising the magnetic tapes with requests need to wait comparably long until a robotic arm fetches and loads them into a free tape drive unit. This, in turn, may degrade the performance as the mean waiting time for a fulfillment of a request to the tape library system starts increasing drastically.

To mitigate the burden of the robotic arms used to load and unload cartridges, a scheme of accumulating multiple requests before sending them to the tape library has been proposed. At light loads though, this scheme is problematic because it takes a long time to accumulate a sufficient number of requests which in turn increases delay and degrades performance. This may represent currently an unsolved dilemma of technical requirements.

None of the known state-of-the-art documents proposes a solution to this problem. E.g., document U.S. Pat. No. 8,224,495 B2 proposes a memory management system and a related method for an open platform. The memory management system utilizes the main spirit of sharing service in the open platform. When the used memory in a local open platform exceeds an upper limit, the standard service bundle access interface is used for accessing the standard service bundle in a remote open platform. Hence, the standard service bundle in the local open platform can be off-loaded to release the memory space so as to resolve the memory shortage problem. Furthermore, document U.S. Pat. No. 5,500,803 A proposes an automatic cartridge system optimizing the time it takes to execute a series of cartridge requests. After a cartridge request is received, the library controller calculates the approximate time it would take to execute each possible sequence of pending cartridge requests. The library controller then executes the first request in the sequence of pending requests which would take the shortest elapsed time. This series of calculation and executions continues until all requests have been completed.

SUMMARY OF THE INVENTION

According to one aspect of the present invention, a computer-implemented method for controlling an operation of a tape library system, comprising at least one magnetic-tape drive unit and a plurality of tape cartridges, wherein the operation of the tape library system may comprise a usage optimization of available resources of the tape library system, may be provided. The method may comprise determining a load value of the resources of the tape library system, accumulating requests to a tape cartridge in a batch before using tape library system to physically accessing the tape cartridge, and dynamically adjusting a number of requests in the batch before physically accessing the tape cartridge depending on the load value such that a response time of the tape library system is optimized.

According to another aspect of the present invention, a tape library system for controlling an operation of a tape library system, comprising at least one magnet tape drive unit and a plurality of tape cartridges, wherein the operation of the tape library system comprises a usage optimization of available resources of the tape library system, may be provided. The system may comprise one or more processors and a memory operatively coupled to the one or more processors, wherein the memory stores program code portions which, when executed by the one or more processors, enable the one or more processors to determine a load value of the resources of the tape library system to accumulate requests to a tape cartridge in a batch before using the tape library system to physically accessing the tape cartridge, and to dynamically adjust a number of requests in the batch before physically accessing the tape cartridge depending on the load value such that a response time of the tape library system is optimized.

Furthermore, embodiments may take the form of a related computer program product, accessible from a computer-usable or computer-readable medium providing program code for use by or in connection with a computer or any instruction execution system by or in connection with a computer or any instruction execution system. For the purpose of this description, a computer-usable or computer-readable medium may be any apparatus that may contain means for storing, communicating, propagating or transporting the program for use by or in connection, with the instruction execution system, apparatus, or device.

BRIEF DESCRIPTION OF THE DRAWINGS

It should be noted that embodiments of the invention are described with reference to different subject-matters. In particular, some embodiments are described with reference to method type claims, whereas other embodiments are described with reference to apparatus type claims. However, a person skilled in the art will gather from the above and the following description that, unless otherwise notified, in addition to any combination of features belonging to one type of subject—matter, also any combination between features relating to different subject—matters, in particular, between features of the method type claims, and features of the apparatus type claims, is considered as to be disclosed within this document.

The aspects defined above, and further aspects of the present invention are apparent from the examples of embodiments to be described hereinafter and are explained with reference to the examples of embodiments to which the invention is not limited.

Figure 1:
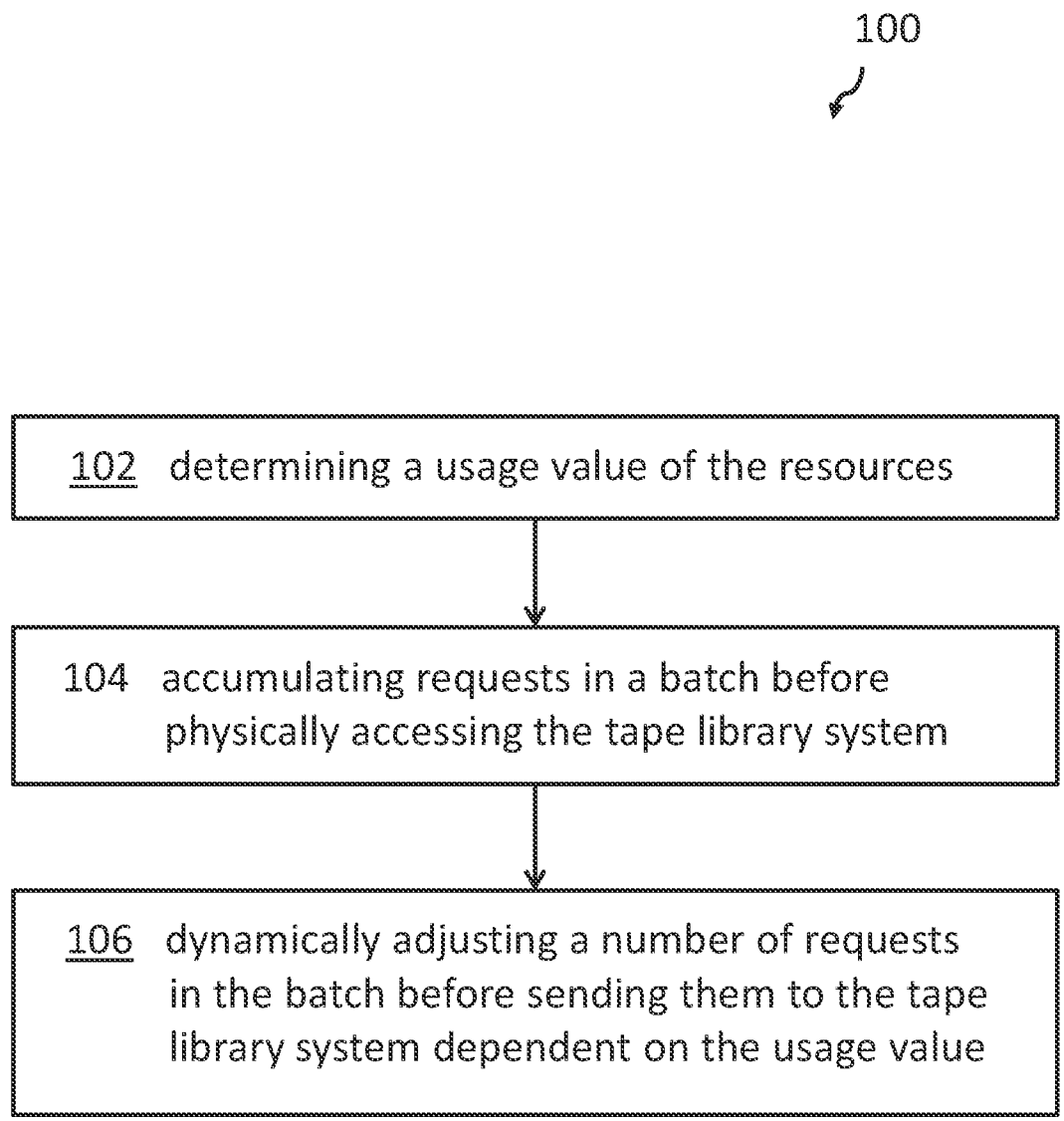

Preferred embodiments of the invention will be described, by way of example only, and with reference to the following drawings:

FIG. 1 shows a block diagram of an embodiment of the inventive computer-implemented method for controlling an operation of a tape library system comprising at least one magnet tape drive unit and a plurality of tape cartridges, wherein the operation of the tape library system comprises a usage optimization of available resources of the tape library system.

Figure 2:
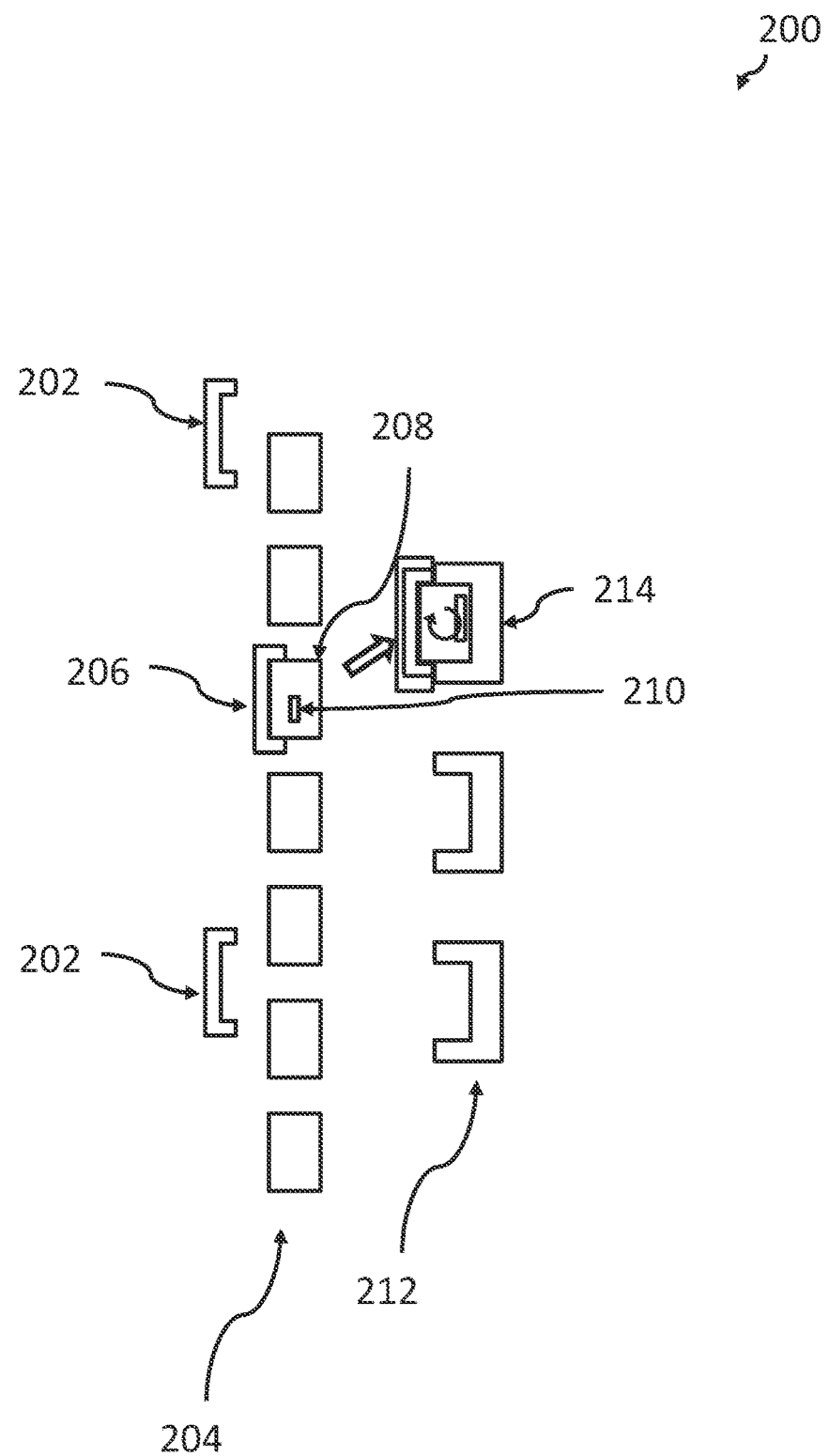

FIG. 2 shows symbolically a tape library system 200 with a plurality of tape drive units, a plurality of magnetic-tape cartridges and a plurality of robotic arms accessors.

Figure 3:
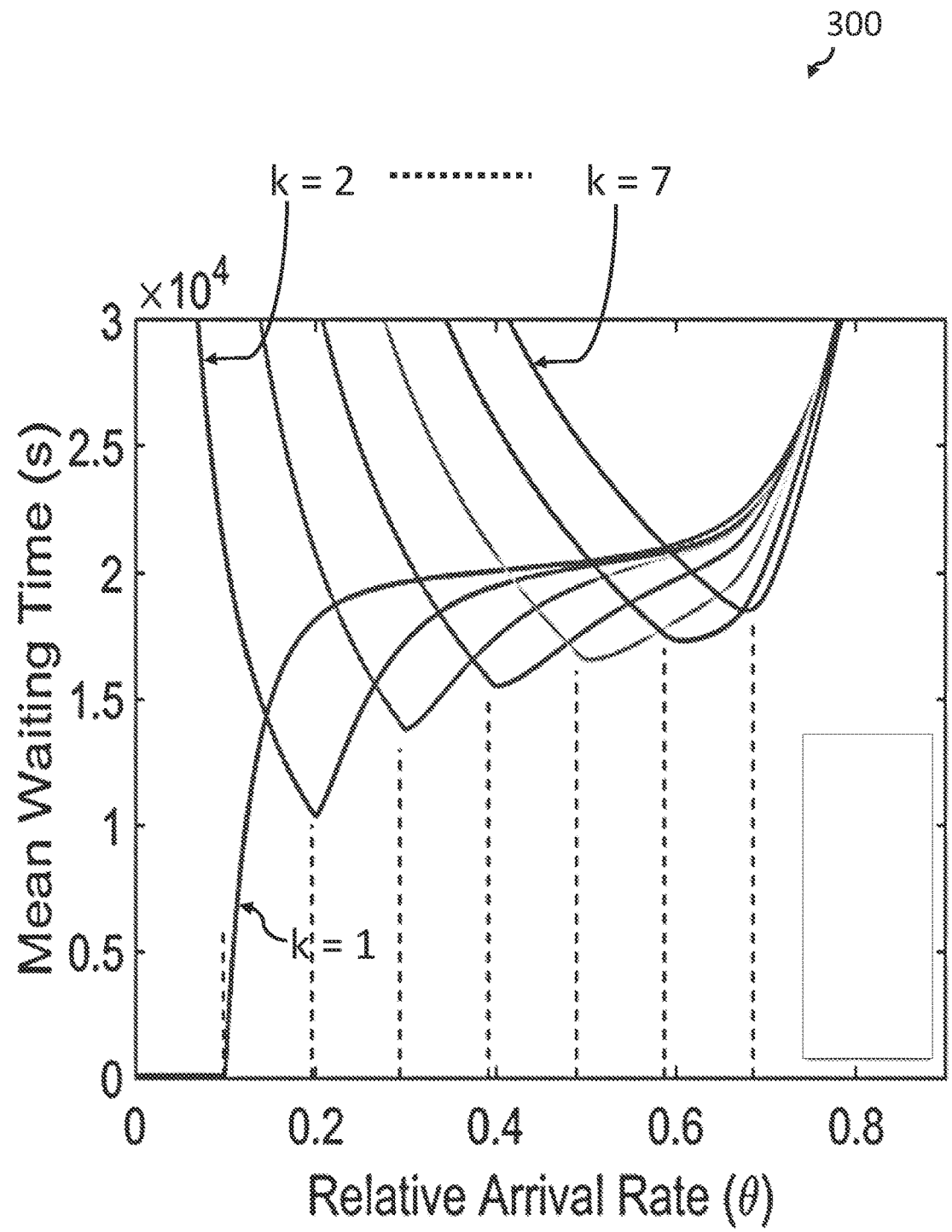

FIG. 3 shows a graph of the average wait time dependent on the relative arrival rate (load) of requests to a tape cartridge.

Figure 4:
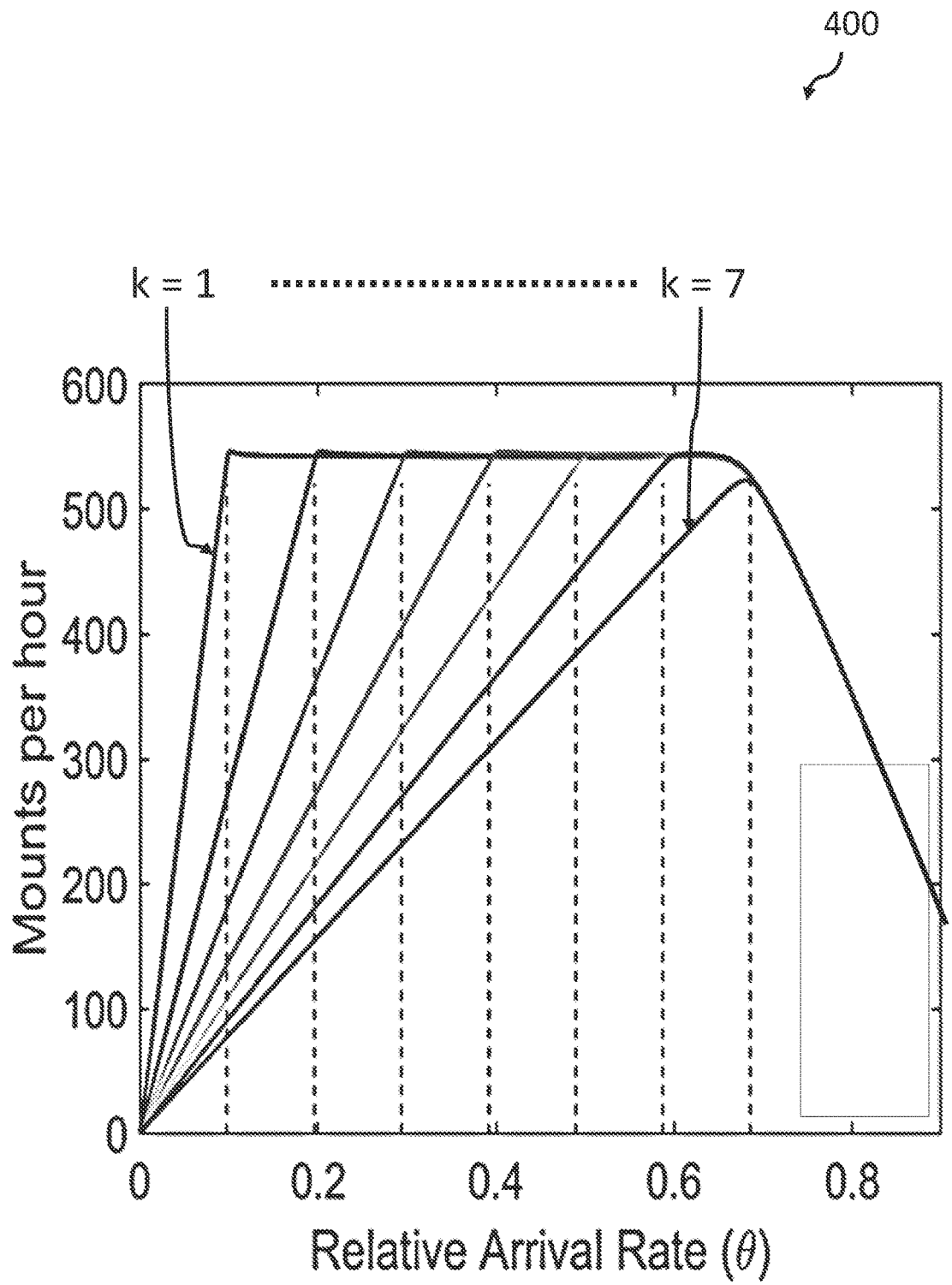

FIG. 4 shows a diagram with numbers of mounts per hour in dependent on the relative arrival rate of requests to a tape cartridge.

FIG. 5 shows again the graph of the average wait time dependent on the relative arrival rate of requests to a tape cartridge, here, however, now with a value k that is dynamic and depends on the system load.

FIG. 6 shows again the diagram with numbers of mounts per hour dependent on the relative arrival rate of requests to a tape cartridge, here, however, now with the value k that is dynamic and depends on the system load.

Figure 7:
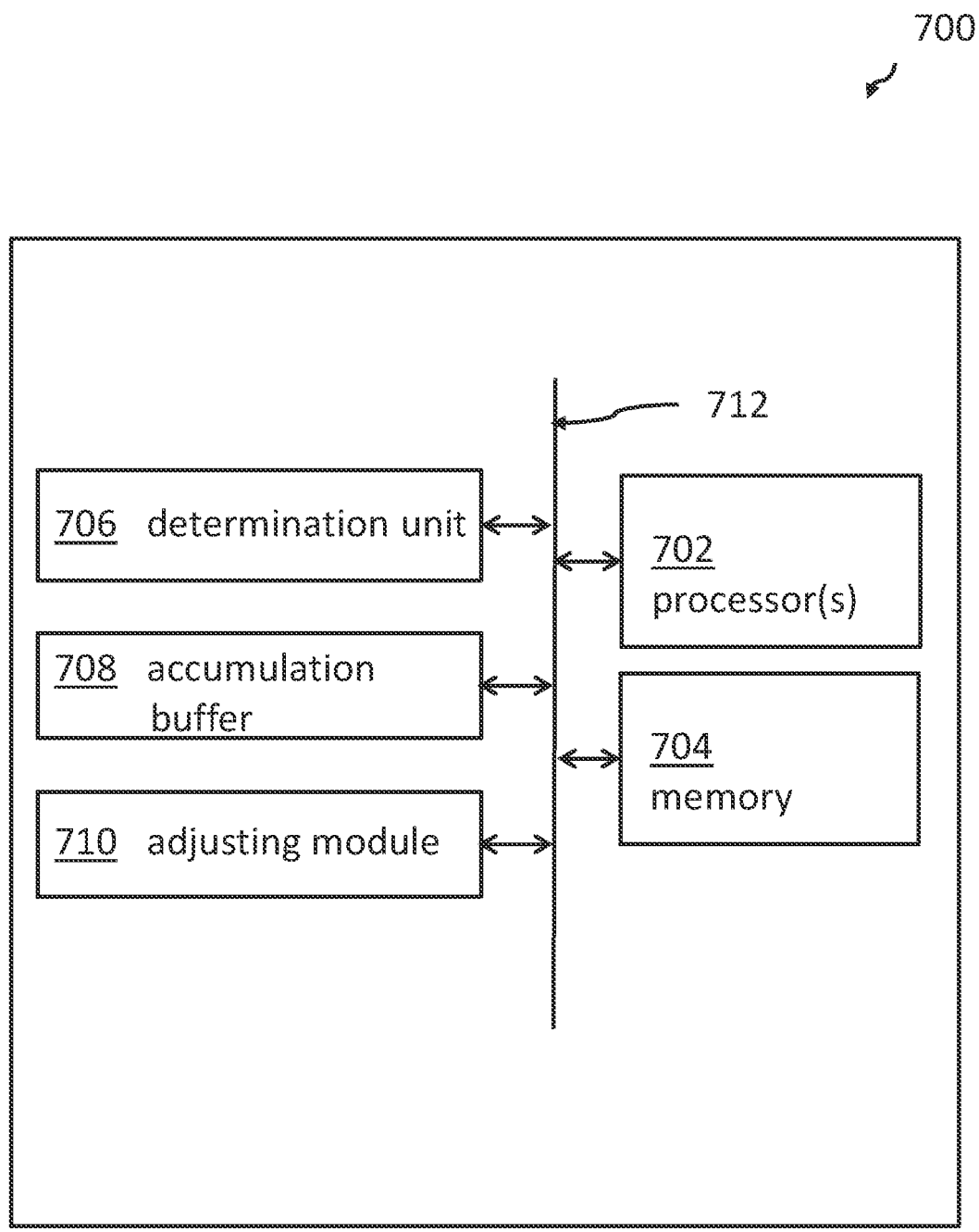

FIG. 7 shows a block diagram of an embodiment of the inventive tape library system for controlling an operation of a tape library system comprising at least one magnet tape drive unit and a plurality of tape cartridges.

Figure 8:
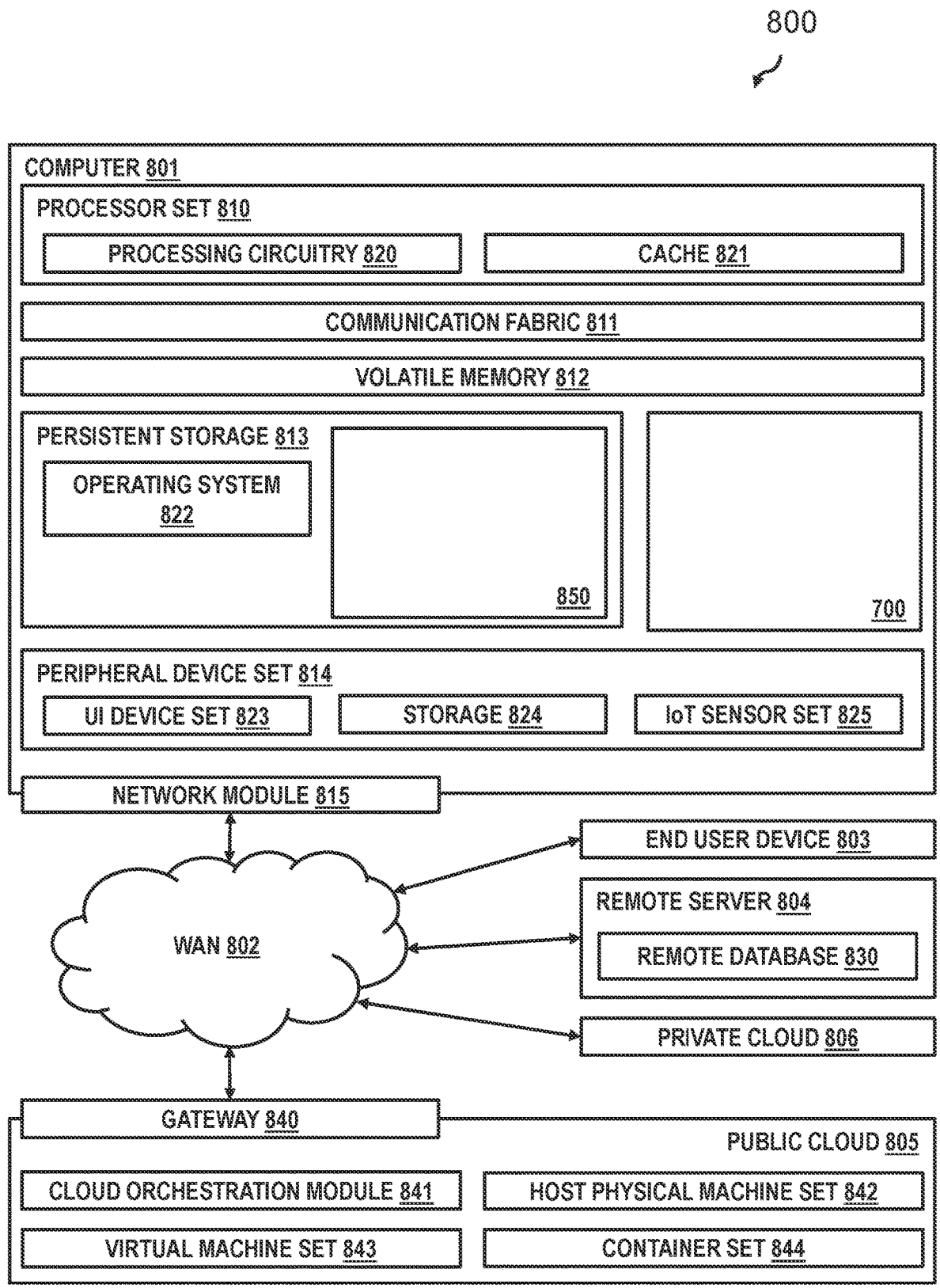

FIG. 8 shows an embodiment of a computing system comprising the system according to FIG. 7.

DETAILED DESCRIPTION

In the context of this description, the following technical conventions, terms and/or expressions may be used:

The term 'tape library system' may denote here a storage device that may comprise one or more tape drives for reading from and writing to magnetic tapes comprised in magnetic-tape cartridges. The cartridges may typically be hold in a plurality of slots. Furthermore, the cartridges are identifiable for which typically a barcode may be used. Additionally, a transport mechanism may be provided to transport the cartridges on request from a tape library into one of the tape drives for accessing the information.

The term 'magnet tape drive unit' may denote the just mentioned tape drive for reading and writing to magnetic tapes.

The term 'tape cartridge' may denote a unit comprising a magnetic tape to be inserted into the tape drive for reading and writing data from/to the magnetic tape inside the cartridge.

The term 'accessor' may denote a mechanical component adapted for fetching a tape cartridge from the tape library insert it into a tape drive unit and—on request—transported back to a storage for the cartridges, typically the tape library. Typically, a robot arm supports the accessor.

The term 'available resources of the tape library system' may denote all components of the tape library system, in particular those influencing the performance of the tape library. Here, the magnetic-tape drive unit(s).

The term 'load value' may denote a performance value of the tape library system.

The term 'batch' may denote a collection of requests for accessing data stored on a specific magnetic tape in a related specific cartridge. A related 'batch size' may denote the number of requests in the batch of requests before it is used to access the cartridge physically, i.e., before the accessor becomes active for this cartridge.

The term 'physically accessing the tape library system' may denote the process of activating the accessor, i.e., the mechanical components which may influence the performance of the tape library system in the most significant way. Before, the tape library system may have been "only" logically addressed, e.g., by receiving a request to write or read data from any of the cartridges of the tape library system.

The term 'dynamically adjusting' may denote that not a fixed batch size is used but that the batch size may be adjusted constantly to ensure a constantly optimized performance, i.e., response time for the library system. E.g., during low activity phases of the tape library system, a batch size of "1" may be good in order to not have too long wait times, before a physical access to a tape cartridge may happen. On the other side, during high activity phases of the tape library system—a constantly moving accessor or robotic arm—a higher batch size of e.g., "3" or "7" or other values may be advisable.

The proposed computer-implemented method for controlling an operation of a tape library system comprising at least one magnet tape drive unit and a plurality of tape cartridges may offer multiple advantages, technical effects, contributions and/or improvements:

The new and dynamically adaptable access schema to tape cartridges in tape library systems improves the so far used method to accumulate a series of requests to a tape cartridge. In comparison to the state-of-the-art, where the number of accumulated requests may relate to a fixed preconfigured number, the number of accumulated requests may now be dynamically adapted in response to the incoming requests per time period and the available resources of the tape library system. These may vary from configuration to configuration and also the incoming requests during a time period may vary over time. Hence, accumulating a fixed amount of requests to a tape cartridge represents a major disadvantage of traditional tape library systems which will be overcome be the concept of dynamically adapting the batch size according to predefined rules.

Therefore, the advantageous concept proposed here may guarantee that an average wait time when serving requests may reach a minimum possible by employing an access scheme where requests are sent to the tape library in batches of variable size. Thereby, the number of requests in each batch for accessing a specific cartridge may vary depending on the load of the tape library system. When the robotic mechanism—i.e., the accessor—is not a bottleneck, requests may be sent immediately to the tape library as they arrive; i.e., the batch size is 1. However, when the robotic mechanism tends to become a bottleneck, requests may be accumulated and sent to the tape library system in batches. In particular, the accumulation scheme may form batches of k requests and subsequently sends them to the tape library. The proposed adaptation of the parameter k may work in both directions, i.e., during periods of an increased number of requests as well as during periods of a low number of arriving requests to a tape cartridge.

Thereby, this scheme is dynamic, and the parameter k is not fixed, but it may vary depending on the load on the system. This access scheme may continue to work successfully even if one (or more) of a plurality of robotic arms in the tape library, or one or more of a plurality of the tape drive units, may be damaged or put in sleep mode on purpose.

Therefore, also under faulty conditions of the tape library system, the system performance may be improved, continuously evaluated and adjusted to the maximum possible performance. Based on this, the tape library system may continue to be appropriately configured to achieve appropriate storage provisioning and dimensioning. This new way to operate the tape library system may also increase user satisfaction as well as using available resources in a better way.

In the following, additional embodiments of the inventive concept—applicable for the method as well as for the system—will be described.

According to a preferred embodiment of the method, the resources of the tape library system may comprise at least the at least one magnet tape drive unit, the plurality of tape cartridges and at least one accessor which is adapted to move a tape cartridge to the at least one magnet tape drive unit and to subsequently remove it. The accessor may typically be a robotic arm.

According to an interesting embodiment of the method, the at least one accessor has the most significant impact on a performance value–i.e., average wait time of the tape library system. This may be valid up to a maximum number of required accessors. Beyond such number, the performance of the tape library system may no longer be improved.

According to an advantageous embodiment, the method may also comprise determining load-value-dependent average wait times—i.e., an equivalent for the performance of the tape library system—for serving requests as a function of different batch sizes resulting in a family of relationships. These relationships may be represented by a family curves an X-Y-representation, as a table of values or as a mathematical relationship, i.e., a function. Thereby, the x-axes may represent the relative arrival rate of requests, the y-axis may represent an average wait time for serving a request and the family members of the relationships may be identifiable by the batch size.

According to an advanced embodiment, the method may also comprise selecting the batch size resulting in the lowest mean waiting time depending on the determined resulting relationships. This may guarantee a maximum performance of the tape library system when accessing a cartridge.

According to another enhanced embodiment of the method, the at least one accessor may become a bottleneck if it is determined that the following expression is true:

$a<(2*R*d)/(BI+U+M)$, where a=number of accessors in the tape library system,
d=number of magnetic-tape drive units in the tape library system,
R=robot transfer time, i.e., the time required for a robot to fetch a tape and mount it on the tape drive, or unmount it from the tape drive and put it back in the library,
BI=average service time of an initial request, i.e., a first request to a cartridge if the cartridge is not yet mounted,
BN=average service time of a non-initial request, i.e., for all requests that are not initial,
U=average unmount time of a tape cartridge, and
M=average mount time for a tape cartridge.

According to another advantageous embodiment of the method, the load value may be determined as load value=lambda/lambda_max, where lambda=arrival rate of requests to the tape library system,
lambda_max=a maximum of an arrival rate of requests to the tape library system that the tape library system is capable of processing, i.e., with a predefined and limited mean response time for a request.

According to a useful embodiment of the method, lambda_max may be defined as lambda_max=$d/BN$, where d=number of magnetic-tape drive units in the tape library system, and
BN=average service time of a non-initial request.

According to a permissive embodiment of the method, the tape cartridge may be an IBM 3592 tape cartridges compatible tape cartridge. This type of tape cartridge is currently widely used and may be used as a reference. However, the proposed method may also be functional with any other type of cartridge comprising magnetic tapes.

According to another permissive embodiment of the method, the accessor may be a robotic arm which may be a part of the tape library system. Using a robotic arm as accessor is currently the most widely implemented form of moving tape cartridges into the magnetic-tape drive unit.

In the following, a detailed description of the figures will be given. All instructions in the figures are schematic. Firstly, a block diagram of an embodiment of the inventive computer-implemented method for controlling an operation of a tape library system comprising at least one magnet tape drive unit and a plurality of tape cartridges is given. Afterwards, further embodiments, as well as embodiments of the related tape library system will be described.

FIG. 1 shows a block diagram of a preferred embodiment of the computer-implemented method 100 for controlling an operation of a tape library system comprising at least one magnet tape drive unit and a plurality of tape cartridges. Thereby, the operation of the tape library system comprises a usage optimization of available resources of the tape library system. A typical tape library system can have, e.g., one configuration of 64 tape drive units with access to, e.g., 6400 tape cartridges. Other configurations may allow more than 15,000, again others more than 20,000 tape cartridges. At least one accessor, e.g., a robotic arm, can handle the placement of the tape cartridges into the tape drive units. However, also any other configuration may be used as long as tape cartridges are loaded automatically to the different tape drive units.

The method 100 comprising determining. 102, a load value—e.g., also denoted as theta, which is equivalent to a relative arrival rate of the results of the request—of the resources of the tape library system. The method 100 comprises also accumulating, 104, —e.g., k—requests—related to read or write operations—to a cartridge in a batch before using the tape library system to access the tape cartridge. A distinction should be made between logical and physical access to the tape library system. As logical access one may see to address the request of the tape library system. As physical access, one may count any of the mechanical components—e.g., the robotic arm, or physically accessing a tape by a read or a write operation.

Additionally, the method 100 comprises dynamically adjusting, 106, a number of k requests (k=1, 2, . . . , n) in the batch before physically accessing the tape library system depending on the load value such that a response time of the tape library system is optimized.

FIG. 2 shows symbolically a tape library system 200 with a plurality of tape drive units 212, a plurality of magnetic-tape cartridges 204 and a plurality of robotic arms accessors 202. If the data 210 symbolized by the square in cartridge 208 needs to be read, the accessor 206 moves the cartridge 208 into a free drive unit—here symbolized as drive unit 214—so that the drive unit 214 can wind the magnetic tape of the cartridge to the required position to read the requested data.

Moving cartridge 208 into the tape drive unit 214 for an initial read requires a comparably long time. Reading again from the same cartridge 208 which may still be in the tape drive unit 214, needs a much lower time amount. Therefore, in the past, it was a useful approach to accumulate a fixed number of requests to the same tape cartridge. However, this static configuration typically leads to long average access times if the batch size of received requests and the load of the tape library system are not carefully adjusted to each other. However, this static configuration becomes a problem in dynamic environments with a varying number of requests and/or a variable system performance of the tape library system. This can be seen in the next figures.

FIG. 3 shows a graph 300 of the average wait time (or as in the figures "mean waiting time"—both expression should be usable in a synonymic manner throughout this document) dependent on the relative arrival rate, θ, of requests to a tape cartridge. The different curves show exemplary different batch sizes from k=1 to k=7. As exemplary configuration for the tape library system, a system with 6400 cartridges and 64 tape drive units as well as two robotic arms are assumed. The robot transfer time has been measured to be 6.65 seconds. The average service time of an initial and non-initial service request is 64.34 seconds and 41.67 seven seconds, respectively for this exemplary configuration. The average mount time is 21.65 seconds and the average unmount time is 89.65 seconds.

In this configuration, the robotic mechanism is a bottleneck if $$a<(2*R*d)/(BI+U+M), \text{ where}$$

a: number of robot arms,
d: number of tape drives,
R: robot transfer time,
BI: average service time of an initial request,
BN: average service time of a non-initial request,
U: average unmount time, and
M: average mount time.

For the configuration and the values considered, the condition defined by the formula above yields: a<4.93. Thus, for a=2, the robotic mechanism is a bottleneck. This can also be seen in the next figure.

So, in general, if the condition that the robotic mechanism is a bottleneck, as a result, the average wait time of a request starts increasing drastically at a load value $$\text{theta\_1}=a*BN/(2*R*d).$$

The load of the tape library system is expressed by the relative arrival rate, θ, which is the ratio of the arrival rate of requests to the maximum possible arrival rate that the tape library system can handle, which is equal to d/BN=1.5 requests per second.

For the configuration considered, it holds that theta_1=0.098. When the accumulation mechanism is not used, the average wait time, which is shown by the curve for k=1 in FIG. 3, is low for loads not exceeding theta_1. It is observed that at load theta_1, which is indicated by the first vertical dashed line, the average wait time starts increasing drastically. This is due to the fact that at this point the robot activity reaches the maximum possible value of a/(2*R)=541 mounts per hour, as shown in FIG. 4, and the robot becomes a bottleneck. For higher loads, the robot constantly mounts and unmounts cartridges while some cartridges are idle and wait to be unmounted from the tape drives and other cartridges with requests wait to be mounted. The performance of the static accumulation scheme when the value k is fixed as a function of the system load is shown in FIGS. 3 and 4. The robot mechanism is no longer a bottleneck when.

$$k>=k*=\text{ceiling}([(2*R*d)-a*(BI-BN+U+M)]/(a*BN)).$$

For the configuration considered, it holds that k*=7, and as demonstrated in FIG. 3, for k=7 the robotic mechanism is no longer a bottleneck.

FIG. 4 shows a diagram 400 with numbers of mounts per hour dependent on the relative arrival rate, θ, of requests to a tape cartridge. The value of 550 mounts in FIG. 4 can be recognized as the maximum possible for the assumed tape library system, given the bottleneck of the robotic arms.

However, for $$k>=k*=\text{ceiling}([(2*R*d)-a*(BI-BN+U+M)]/(a*BN))$$

the robotic mechanism is no longer a bottleneck. For the configuration considered, it holds that k*=7. Unfortunately, tape library systems typically do not have a quasi-constant arrival rate of requests. Thus, system designers may tend to select larger and more powerful tape library systems in order to guarantee a good access time to store data on the magnetic tapes of the cartridges. The following figure shows the effects of the variably selectable batch size k.

Figure 5:
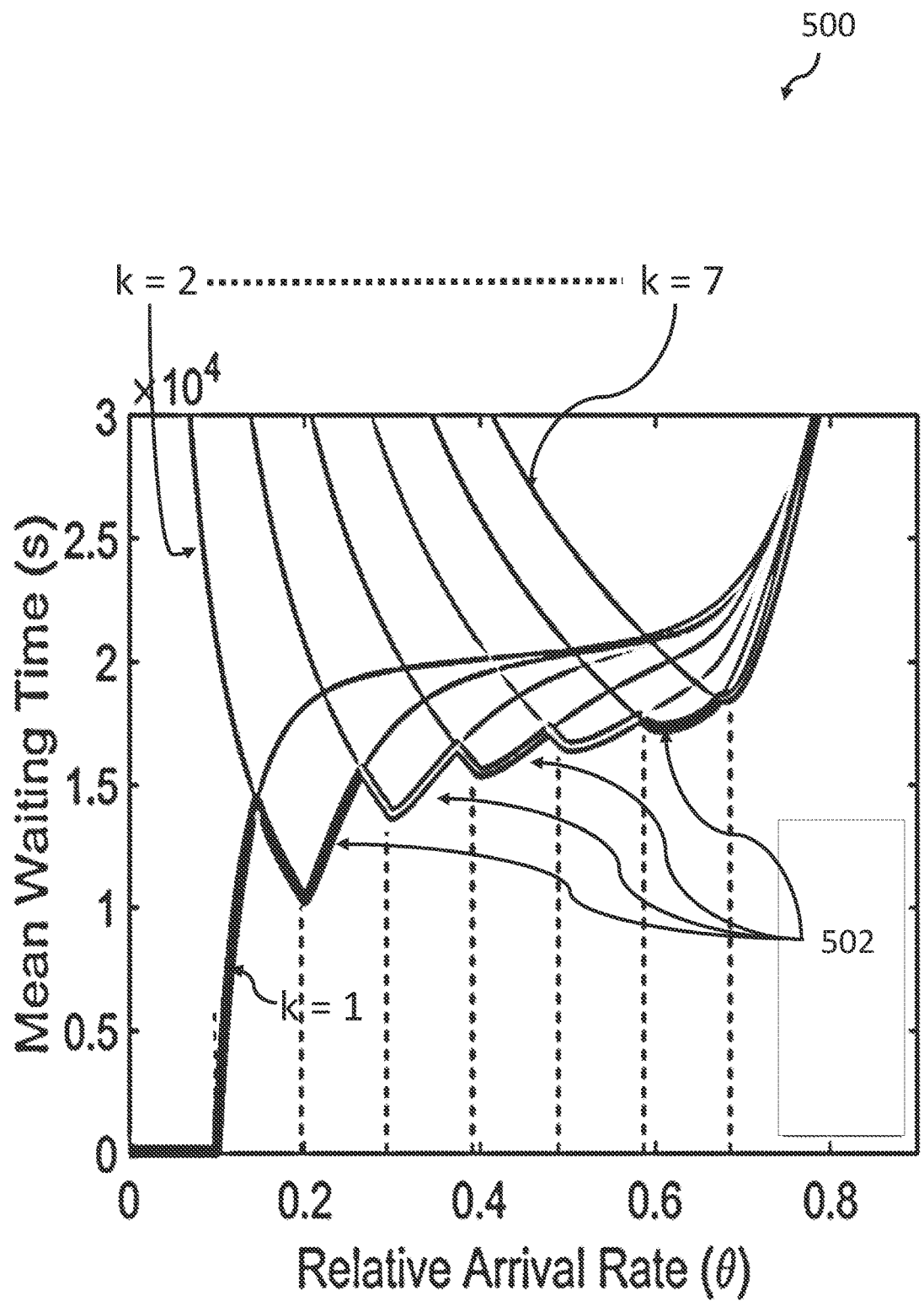

FIG. 5 shows again the graph 500 of the average wait time dependent on the relative arrival rate, θ, of requests to a tape cartridge, here, however, with the value of k being dynamic, such that, depending on the system load, it yields the optimal performance (minimum waiting time), which is shown by the thick line 502. The corresponding robot activity is shown again in FIG. 6. FIG. 5 shows the situation of the dynamic accumulation scheme proposed here. The bold line 502 represents the above-discussed resulting minimum curve.

Figure 6:
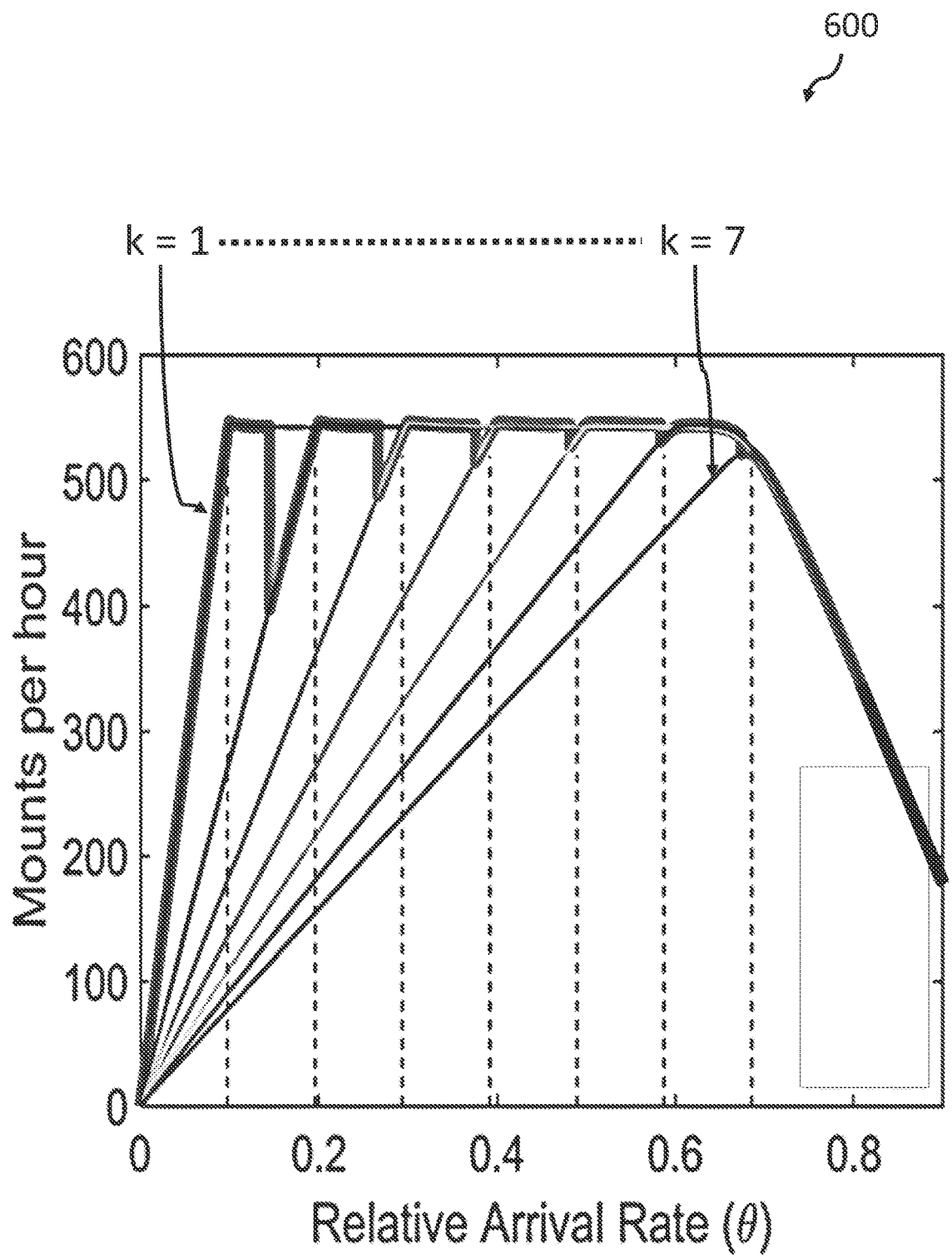

The average wait time for k=2 is shown in FIG. 5 by the curve denoted as k=2, which intersects the (k=1)-curve, denoted as k=1, at theta=0.144. When the load exceeds 0.144, the accumulation mechanism with batch size k=2 is activated and therefore the average wait time and the robot activity are reduced. This is depicted by the resulting composed lowest curve, which exhibits a minimum value roughly at theta_2=2*theta_1=0.196. Also, the robot activity is reduced as shown in FIG. 6, and it progressively increases reaching its maximum value when the load is equal to theta_2=0.196, which is indicated by the second vertical dashed line.

The mean waiting time for k=3 is shown by the curve denoted as k=3 in FIG. 5, which intersects the curve denoted as k=2 at theta=0.267. When the load exceeds 0.267, the accumulation mechanism switches the batch size from k=2 to k=3, which results in reducing the average wait time and the robot activity. This is depicted by the composed lowest curve, which exhibits a minimum value roughly at theta_3=3*theta_1=0.294. Also, the robot activity is reduced as shown in FIG. 6, and it progressively increases reaching its maximum value when the load is equal to theta_3=0.294, which is indicated by the third vertical dashed line.

The mean waiting time for k=4 is shown by the (k=4)-curve in FIG. 5, which intersects the (k=3)-curve at theta=0.376. When the load exceeds 0.376, the accumulation mechanism switches the batch length from k=3 to k=4, which results in reducing the average wait time and the robot activity. This is depicted by the composed lowest curve again, which exhibits a minimum value roughly at theta_4=4*theta_1=0.392. Also, the robot activity is reduced, as shown in FIG. 6, and it progressively increases reaching its maximum value when the load is equal to theta_4=0.392, which is indicated by the fourth vertical dashed line.

The average wait time for k=5 is shown by the (k=5)-curve in FIG. 5, which intersects the (k=4)-curve at theta=0.482. When the load exceeds 0.482, the accumulation mechanism switches the batch length from k=4 to k=5, which results in reducing the average wait time and the robot activity. This is depicted by the composed lowest curve again, which exhibits a minimum value roughly at theta_5=5*theta_1=0.49. Also, the robot activity is reduced as shown in FIG. 6, and it progressively increases reaching its maximum value when the load is equal to theta_5=0.49, which is indicated by the fifth vertical dashed line.

The average wait time for k=6 is shown by the (k=6)-curve in FIG. 5, which intersects the (k=4)-curve at theta=0.584. When the load exceeds 0.584, the accumulation mechanism switches the batch length from k=5 to k=6, which results in reducing the average wait time and the robot activity. This is depicted by the ceiling curve, which exhibits a minimum value roughly at theta_6=6*theta_1=0.587. Also, the robot activity is reduced, as shown in FIG. 6, and it progressively increases reaching its maximum value when the load is equal to theta_6=0.587, which is indicated by the sixth vertical dashed line.

The average wait time for k=7 is shown by the last curve in FIG. 5, which intersects the (k=6)-curve at theta=0.674. When the load exceeds 0.674, the accumulation mechanism switches the batch size from k=6 to k=7, which results in reducing the average wait time and the robot activity. This is depicted by the composed lowest curve, which exhibits a minimum value roughly at theta_7=7*theta_1=0.685. Also, the robot activity is reduced, as shown in FIG. 6, and it progressively increases reaching its maximum value when the load is equal to theta_7=0.685, which is indicated by the seventh vertical dashed line.

The proposed methodology enables a judicious selection of the tape library parameters in order to achieve a desired performance level.

FIG. 6 shows again the diagram 600 with numbers of mounts per hour dependent on the relative arrival rate, θ, of requests to a tape cartridge, here, however, with the value of k being dynamic and depending on the system load. Hence, it reflects the number of mounts per hour under the minimum condition of FIG. 5.

The following advantages can be derived directly and visually: (i) the tape library system performance is improved and evaluated; (ii) the tape library system is appropriately configured to achieve appropriate storage provisioning and dimensioning; and (iii) as the load on the tape library system changes, the accumulation parameter k is also modified to ensure optimal performance of the tape library system.

FIG. 7 shows a block diagram of an embodiment of the tape library system 700 for controlling an operation of a tape library system comprising at least one magnet tape drive unit and a plurality of tape cartridges, where the operation of the tape library system comprises a usage optimization of available resources of the tape library system. The system comprises one or more processors 702 and a memory 704 operatively coupled to the one or more processors 702, wherein the memory stores program code portions which, when executed by the one or more processors 702, enable the one or more processors 702 to determine—in particular by the determination unit 706—a load value of the resources of the tape library system, to accumulate—in particular, by the accumulation buffer 708—requests to a cartridge in a batch before suing the tape library system to access the tape cartridge, and dynamically adjust—in particular by the adjusting module 710—a number of requests in the batch before physically accessing the tape library system depending on the load value such that a response time of the tape library system is optimized.

It shall also be mentioned that all functional units, modules and functional blocks—in particular the one or more processors 702, the memory 704, the determination unit 706, the accumulation buffer 708, and the adjusting module 710—may be communicatively coupled to each other for signal or message exchange in a selected 1:1 manner. Alternatively, the functional units, modules and functional blocks can be linked to a system internal bus system 712 for a selective signal or message exchange.

Before describing a computing system adapted to support the inventive concept described here, another set-up should be mentioned: For this, the load-value of the tape library system may be a more or less fixed value. Then during a first time period—e.g., a first day of operation—the tape library system is operated with a batch size of k=1 and the resulting performance is recorded; during a second time period—e.g., a second day—the tape library system may be operated with the batch size of k=2, . . . , at a third day with the batch size of k=3, and so on up to a predefined number of k. Subsequently, the value of batch size k that yields the optimal of the corresponding recorded performances is identified and from there on the system operates with this value for the batch size. When the load of the system changes, this process could be repeated in order to ensure that the appropriate value of k is selected. Thus, even under such circumstances, the tape library system may be enabled to optimize a system resource optimization based on adapting automatically and dynamically the batch size for requests to a tape cartridge. Hence, a knowledge of the above-mentioned relationship, table of function may not be required under the here-described setup.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment (CPP embodiment or CPP) is a term used in the present disclosure to describe any set of one, or more, storage media (also called mediums) collectively included in a set of one, or more, storage devices that collectively include machine readable code corresponding to instructions and/or data for performing computer operations specified in a given CPP claim. A storage device is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include diskette, hard disk, random access memory (RAM), read-only memory (ROM), erasable programmable read-only memory (EPROM or Flash memory), static random access memory (SRAM), compact disc read-only memory (CD—ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 8 shows a computing environment 800 comprising an example of an environment for the execution of at least some of the computer code involved in performing the inventive methods, such as the computer-implemented method for controlling an operation of a tape library system comprising at least one magnet tape drive unit and a plurality of tape cartridges, wherein the operation of the tape library system comprises a usage optimization of available resources of the tape library system 850.

In addition to block 850, computing environment 800 includes, for example, computer 801, wide area network (WAN) 802, end user device (EUD) 803, remote server 804, public cloud 805, and private cloud 806. In this embodiment, computer 801 includes processor set 810 (including processing circuitry 820 and cache 821), communication fabric 811, volatile memory 812, persistent storage 813 (including operating system 822 and block 850, as identified above), peripheral device set 814 (including user interface (UI), device set 823, storage 824, and Internet of Things (IoT) sensor set 825), and network module 815. Remote server 804 includes remote database 830. Public cloud 805 includes gateway 840, cloud orchestration module 841, host physical machine set 842, virtual machine set 843, and container set 844.

COMPUTER 801 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 830. As is well understood in the art of computer technology, and depending upon the technology, performance of a computer-implemented method may be distributed among multiple computers and/or between multiple locations. On the other hand, in this presentation of computing environment 800, detailed discussion is focused on a single computer, specifically computer 801, to keep the presentation as simple as possible. Computer 801 may be located in a cloud, even though it is not shown in a cloud in FIG. 8. On the other hand, computer 801 is not required to be in a cloud except to any extent as may be affirmatively indicated.

PROCESSOR SET 810 includes one, or more, computer processors of any type now known or to be developed in the future. Processing circuitry 820 may be distributed over multiple packages, for example, multiple, coordinated integrated circuit chips. Processing circuitry 820 may implement multiple processor threads and/or multiple processor cores. Cache 821 is memory that is located in the processor chip package(s) and is typically used for data or code that should be available for rapid access by the threads or cores running on processor set 810. Cache memories are typically organized into multiple levels depending upon relative proximity to the processing circuitry. Alternatively, some, or all, of the cache for the processor set may be located "off chip." In some computing environments, processor set 810 may be designed for working with qubits and performing quantum computing.

Computer readable program instructions are typically loaded onto computer 801 to cause a series of operational steps to be performed by processor set 810 of computer 801 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 821 and the other storage media discussed below. The program instructions, and associated data, are accessed by processor set 810 to control and direct performance of the inventive methods. In computing environment 800, at least some of the instructions for performing the inventive methods may be stored in block 850 in persistent storage 813.

COMMUNICATION FABRIC 811 is the signal conduction paths that allow the various components of computer 801 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 812 is any type of volatile memory now known or to be developed in the future. Examples include dynamic type random access memory (RAM) or static type RAM. Typically, the volatile memory is characterized by random access, but this is not required unless affirmatively indicated. In computer 801, the volatile memory 812 is located in a single package and is internal to computer 801, but, alternatively or additionally, the volatile memory may be distributed over multiple packages and/or located externally with respect to computer 801.

PERSISTENT STORAGE 813 is any form of non-volatile storage for computers that is now known or to be developed in the future. The non-volatility of this storage means that the stored data is maintained regardless of whether power is being supplied to computer 801 and/or directly to persistent storage 813. Persistent storage 813 may be a read only memory (ROM), but typically at least a portion of the persistent storage allows writing of data, deletion of data and re-writing of data. Some familiar forms of persistent storage include magnetic disks and solid-state storage devices. Operating system 822 may take several forms, such as various known proprietary operating systems or open-source Portable Operating System Interface type operating systems that employ a kernel. The code included in block 850 typically includes at least some of the computer code involved in performing the inventive methods.

PERIPHERAL DEVICE SET 814 includes the set of peripheral devices of computer 801. Data communication connections between the peripheral devices and the other components of computer 801 may be implemented in various ways, such as Bluetooth connections, Near-Field Communication (NFC) connections, connections made by cables (such as universal serial bus (USB) type cables), insertion type connections (e.g., secure digital (SD) card), connections made though local area communication networks and even connections made through wide area networks such as the internet. In various embodiments, UI device set 823 may include components such as a display screen, speaker, microphone, wearable devices (such as goggles and smart watches), keyboard, mouse, printer, touchpad, game controllers, and haptic devices. Storage 824 is external storage, such as an external hard drive, or insertable storage, such as an SD card. Storage 824 may be persistent and/or volatile. In some embodiments, storage 824 may take the form of a quantum computing storage device for storing data in the form of qubits. In embodiments where computer 801 is required to have a large amount of storage (for example, where computer 801 locally stores and manages a large database) then this storage may be provided by peripheral storage devices designed for storing very large amounts of data, such as a storage area network (SAN) that is shared by multiple, geographically distributed computers. IoT sensor set 825 is made up of sensors that can be used in Internet of Things applications. For example, one sensor may be a thermometer and another sensor may be a motion detector.

NETWORK MODULE 815 is the collection of computer software, hardware, and firmware that allows computer 801 to communicate with other computers through WAN 802. Network module 815 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 815 are performed on the same physical hardware device. In other embodiments (e.g., embodiments that utilize software-defined networking (SDN)), the control functions and the forwarding functions of network module 815 are performed on physically separate devices, such that the control functions manage several different network hardware devices. Computer readable program instructions for performing the inventive methods can typically be downloaded to computer 801 from an external computer or external storage device through a network adapter card or network interface included in network module 815.

WAN 802 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 803 is any computer system that is used and controlled by an end user (for example, a customer of an enterprise that operates computer 801) and may take any of the forms discussed above in connection with computer 801. EUD 803 typically receives helpful and useful data from the operations of computer 801. For example, in a hypothetical case where computer 801 is designed to provide a recommendation to an end user, this recommendation would typically be communicated from network module 815 of computer 801 through WAN 802 to EUD 803. In this way, EUD 803 can display, or otherwise present, the recommendation to an end user. In some embodiments, EUD 803 may be a client device, such as thin client, heavy client, mainframe computer, desktop computer and so on.

REMOTE SERVER 804 is any computer system that serves at least some data and/or functionality to computer 801. Remote server 804 may be controlled and used by the same entity that operates computer 801. Remote server 804 represents the machine(s) that collect and store helpful and useful data for use by other computers, such as computer 801. For example, in a hypothetical case where computer 801 is designed and programmed to provide a recommendation based on historical data, then this historical data may be provided to computer 801 from remote database 830 of remote server 804.

PUBLIC CLOUD 805 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 805 is performed by the computer hardware and/or software of cloud orchestration module 841. The computing resources provided by public cloud 805 are typically implemented by virtual computing environments that run on various computers making up the computers of host physical machine set 842, which is the universe of physical computers in and/or available to public cloud 805. The virtual computing environments (VCEs) typically take the form of virtual machines from virtual machine set 843 and/or containers from container set 844. It is understood that these VCEs may be stored as images and may be transferred among and between the various physical machine hosts, either as images or after instantiation of the VCE. Cloud orchestration module 841 manages the transfer and storage of images, deploys new instantiations of VCEs and manages active instantiations of VCE deployments. Gateway 840 is the collection of computer software, hardware, and firmware that allows public cloud 805 to communicate through WAN 802.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 806 is similar to public cloud 805, except that the computing resources are only available for use by a single enterprise. While private cloud 806 is depicted as being in communication with WAN 802, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 805 and private cloud 806 are both part of a larger hybrid cloud.

It should also be mentioned that the tape library system 700 for controlling an operation of a tape library system comprising at least one magnet tape drive unit and a plurality of tape cartridges, wherein the operation of the tape library system comprises a usage optimization of available resources of the tape library system can be an operational sub-system of the computer 801 and may be attached to a computer-internal bus system.

The terminology used herein is for the purpose of describing particular embodiments only and is not intended to limit the invention. As used herein, the singular forms a, and the are intended to include the plural forms as well, unless the context clearly indicates otherwise. It will further be understood that the terms comprises and/or comprising, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

What is claimed is:

1. A computer-implemented method for controlling an operation of a tape library system comprising at least one magnetic-tape drive unit, at least one accessor, and a plurality of tape cartridges, wherein the operation of the tape library system comprises a usage optimization of available resources of the tape library system, the method comprising:
    determining a load value of the resources of the tape library system;
    accumulating requests to a tape cartridge in a batch before using the tape library system to physically access the tape cartridge;
    dynamically adjusting a number of requests in the batch before physically accessing the tape library system depending on the load value such that a response time of the tape library system is optimized; and
    detecting that the at least one accessor has become a bottleneck upon a determination that an expression is true, wherein the expression comprises:

$a<(2*R*d)/(BI+U+M)$, wherein;

a=a number of accessors in the tape library system;
    d=a number of magnetic-tape drive units in the tape library system;
    R=a robot transfer time;
    BI=an average service time of an initial request;
    U=an average unmount time of a tape cartridge; and
    M=an average mount time for a tape cartridge.

2. The method according to claim 1, wherein the resources of the tape library system comprise at least the at least one magnetic-tape drive unit, the plurality of tape cartridges and the at least one accessor which is adapted to move a tape cartridge to the at least one magnetic-tape drive unit and to subsequently remove it.

3. The method according to claim 2, wherein the at least one accessor has a most significant impact on a performance value of the tape library system.

4. The method according to claim 1, further comprising:
    determining load-value-depending average wait times for serving requests as a function of different batch sizes resulting in a family of relationships.

5. The method according to claim 1, further comprising:
    selecting a batch size resulting in a lowest average wait time depending on one or more determined resulting relationships.

6. The method according to claim 1, wherein the load value is determined as:

load value=lambda/lambda_max, wherein;

lambda=an arrival rate of requests to the tape library system; and
    lambda_max=a maximum arrival rate of requests to the tape library system that the tape library system is capable of processing.

7. The method according to claim 6, wherein:

lambda_max=$d/BN$, wherein;

d=a number of magnetic-tape drive units in the tape library system; and
    BN=an average service time of a non-initial request.

8. The method according to claim 1, wherein the tape cartridge is a tape cartridge system.

9. The method according to claim 1, wherein the at least one accessor is a robotic arm.

10. A tape library system for controlling an operation of a tape library system comprising at least one magnetic-tape drive unit, at least one accessor, and a plurality of tape cartridges, wherein the operation of the tape library system comprises a usage optimization of available resources of the tape library system, the tape library system comprising:
    one or more processors and a memory operatively coupled to the one or more processors, wherein the memory stores program code portions which, when executed by the one or more processors, enable the one or more processors to;
    determine a load value of the resources of the tape library system;
    accumulate requests to a tape cartridge in a batch before using the tape library system to physically access the tape cartridge;
    dynamically adjust a number of requests in the batch before physically accessing the tape library system depending on the load value such that a response time of the tape library system is optimized; and detect that the at least one accessor has become a bottleneck upon a determination that an expression is true, wherein the expression comprises:

$a<(2*R*d)/(BI+U+M)$, wherein;

a=a number of accessors in the tape library system;
d=a number of magnetic-tape drive units in the tape library system;
R=a robot transfer time;
BI=an average service time of an initial request;
U=an average unmount time of a tape cartridge; and
M=an average mount time for a tape cartridge.

11. The tape library system according to claim 10, wherein the resources of the tape library system comprise at least the at least one magnetic-tape drive unit, the plurality of tape cartridges and the at least one accessor which is adapted to move a tape cartridge to the at least one magnetic-tape drive unit.

12. The tape library system according to claim 11, wherein the at least one accessor has a most significant impact on a performance value of the tape library system.

13. The tape library system according to claim 10, wherein the one or more processors are further enabled to determine load-value-depending average wait times for serving requests as a function of different batch sizes resulting in a family of relationships.

14. The tape library system according to claim 10, wherein the one or more processors are further enabled to select a batch size resulting in a lowest average wait time depending on one or more determined resulting relationships.

15. The tape library system according to claim 10, wherein the one or more processors are further enabled to determine the load value as:

load value=lambda/lambda_max, wherein;

lambda=an arrival rate of requests to the tape library system; and
lambda_max=a maximum arrival rate of requests to the tape library system that the tape library system is capable of processing.

16. The tape library system according to claim 15, wherein:

$lambda\_max=d/BN$, wherein;

d=a number of magnetic-tape drive units in the tape library system; and
BN=an average service time of a non-initial request.

17. The tape library system according to claim 10, wherein the at least one accessor is a robotic arm.

18. A computer program product for controlling an operation of a tape library system comprising at least one magnetic-tape drive unit, at least one accessor, and a plurality of tape cartridges, wherein the operation of the tape library system comprises a usage optimization of available resources of the tape library system, the computer program product comprising a computer readable storage medium having program instructions embodied therewith, the program instructions being executable by one or more computing systems or controllers to cause the one or more computing systems to:

determine a load value of the resources of the tape library system;

accumulate requests to a tape cartridge in a batch before using the tape library system to physically access the tape cartridge;

dynamically adjust a number of requests in the batch before physically accessing the tape cartridge dependent on the load value such that a response time of the tape library system is optimized; and detect that the at least one accessor has become a bottleneck upon a determination that an expression is true, wherein the expression comprises:

$a<(2*R*d)/(BI+U+M)$, wherein;

a=a number of accessors in the tape library system;
d=a number of magnetic-tape drive units in the tape library system;
R=a robot transfer time;
BI=an average service time of an initial request;
U=an average unmount time of a tape cartridge; and
M=an average mount time for a tape cartridge.

* * * * *